United States Patent [19]

Lien et al.

[11] Patent Number: 4,597,065
[45] Date of Patent: Jun. 24, 1986

[54] CABLE FOR TOWING AIR/WATER GUNS BEHIND A SEISMIC VESSEL

[75] Inventors: Eldar K. Lien, Hosle; Otto Benestad, Jar, both of Norway; Clive Snook, Oegstgeest, Netherlands

[73] Assignee: Geophysical Company of Norway A.S., Horvik, Norway

[21] Appl. No.: 601,598

[22] Filed: Apr. 18, 1984

[30] Foreign Application Priority Data

May 2, 1983 [NO] Norway ................................ 831546

[51] Int. Cl.$^4$ ............................................. G01V 1/38
[52] U.S. Cl. ...................................... 367/20; 367/144; 174/47
[58] Field of Search .......................... 367/20, 144, 154; 174/47; 181/110; 350/96.23

[56] References Cited

U.S. PATENT DOCUMENTS 4,491,939  1/1985  Carpenter ............................ 367/20
4,525,813  6/1985  Burrage ............................... 367/20

Primary Examiner—Thomas H. Tarcza
Assistant Examiner—Ian J. Lobo
Attorney, Agent, or Firm—Holman & Stern

[57] ABSTRACT

A cable for towing air or water guns behind a seismic vessel is constructed with a reinforced air hose in the center region. The air hose (1) is a Kevlar fiber reinforced high pressure air hose with low air diffusion. Outside the hose, signal conductors are placed which are individually insulated with watertight coating and arranged substantially in a single layer of cylindrical elements (2) that are wound around the air hose (1). The interstices between the elements are filled with a water-repelling lubricant. Outside the layer of cylindrical elements (2) is a protective intermediate jacket (3) not intended primarily to have a water-sealing effect, and this is followed by tension-relieving elements (4) preferably disposed in two layers twisted in opposite directions around the intermediate jacket. An outer protective jacket (5) for the entire cable can be provided on the exterior. A cable constructed in this way provides a solution of the water-sealing problem. It is especially intended for digital data transmission.

15 Claims, 1 Drawing Figure

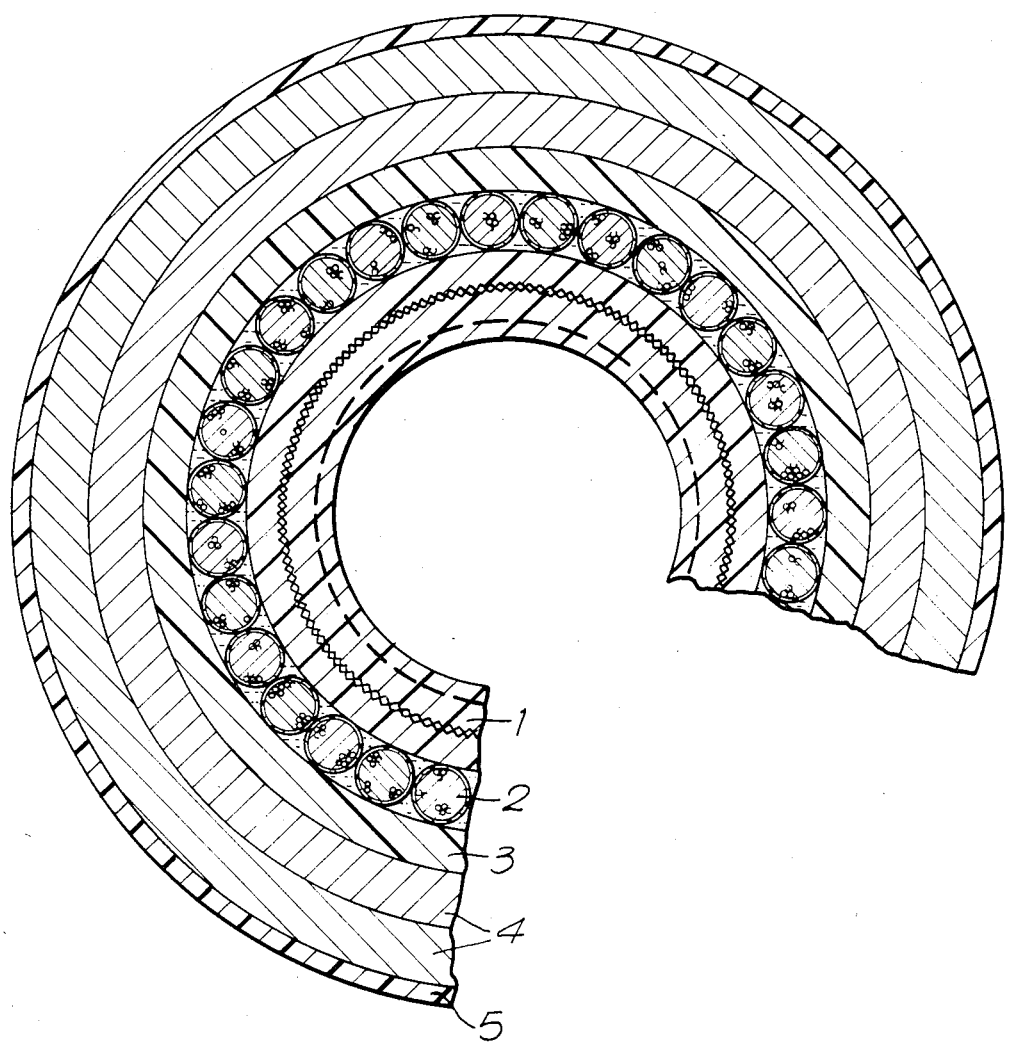

CABLE FOR TOWING AIR/WATER GUNS BEHIND A SEISMIC VESSEL

BACKGROUND OF THE INVENTION

1. Field of the Invention

The present invention relates to a tow cable used for towing air or water guns behind a seismic vessel, known as a gun cable, wherein the cable comprises a reinforced air hose within a protective jacket.

2. Description of the Prior Art

Normally, a seismic vessel will tow 5 to 8 gun cables at the same time, with an array of 4 to 8 guns being attached to each cable.

A gun cable has three main functions: it should be able to withstand a tension of up to 10 tons in the form of peak loads of short duration, and a static tension of 3 to 4 tons continuously; it must supply the guns with compressed air (at a typical pressure of 140 kp/cm$^2$) via at least one high pressure air hose; and it should be able to transmit signals to the guns for actuating firing of the guns on an individual basis, and to transmit discrete signals from the guns for reporting the precise time of individual shots, as well as other electrical signals from close range hydrophones and depth sensors.

The common practice earlier was to supply air to the guns via a separate air hose that was securely lashed to the gun cable. Today, composite cables which combine all of the three main functions in a single cable are available on the market. These cables obviously provide significant advantages in the form of easier handling, but the prior art cables of this type have a number of drawbacks.

A gun cable of this type is usually constructed as follows: at the center of the cable is one (or more) high pressure air hoses of conventional type, consisting of a nylon inner hose with polyester fiber reinforcement; outside the air hose(s) are several layers consisting of electrical conductors and steel wire for relieving cable tension; and outermost is a jacket of artificial material (polyurethane or neoprene, for example) for providing mechanical protection and watertight sealing.

Gun cables of the above type have been in use for about the last five years, and during this time a number of weaknesses have been uncovered. These weaknesses can be summarized as follows: the outer jacket is not adequately watertight either because it is made of a material which itself is not sufficiently water-resistent, or more often because small holes, tears and cracks occur in the jacket as a result of normal handling under difficult conditions; the outer jacket does not provide sufficient mechanical protection and in addition to damage to the jacket itself as mentioned above, breaks may occur in the electrical conductors if the cable is bent too sharply or if it is penetrated by sharp objects; the air hose "works" too much inside the cable. During use, the pressure in the hose pulsates continuously, typically between 70 kp/cm$^2$ and 140 kp/cm$^2$. This causes the diameter of the hose to vary by up to 2 mm. There is reason to believe that the breaks occuring in the electrical conductors may in part be caused by fatigue owing to this pulsation. The outer jacket gets "blisters". Gun cables are sometimes ruined because large bulges or blisters appear in the outer jacket. This is caused by high pressure compressed air which either diffuses through the walls of the air hose or leaks out through inadequately sealed portions of the hose or at the hose termination. This air has no direct path of escape, and since the outer jackets is held in place by its own elasticity, it will blister if the jacket is airtight; the cables have large outside diameters. The complex construction, especially owing to the large number of electrical conductors that are required, results in thick cables which are both cumbersome to handle and which exhibit high resistance to water when they are towed crosscurrent.

By far the biggest weakness of today's gun cables is their vulnerability to water penetration. Water which penetrates the outer jacket will quickly spread along the entire cable, both because of the pulsating effect of the air hose and because microscopic air pockets are formed in the cable when air diffuses from the air hose, and these pockets of air are immediately filled with water. The water results in leakage current between the conductors and causes crossing of signals, so that the cable can no longer perform its intended function. Leakage current occurs in connection with microscopic defects (pinholes) and other damage to the insulation around each individual conductor, or at the end of the cable (the termination) where the electrical conductors terminate in electrical underwater connectors.

Despite the fact that air gun cables have for several years been considered an important source of problems in connection with seismic survey of the sea bed, the cables have not been improved very much during this time. This is probably because it has proved difficult to improve single aspects of the cable without at the same time introducing new problems.

For example, in order to obtain better mechanical protection, cables have been made with the tension-relieving steel wire outside rather than inside the cable. Two full layers of steel wire cable must in that case be utilized, wrapped around the cable in opposite directions to provide torsional balance. These wires must also be of rather thick dimensions to prevent them from fraying easily. The cable one obtains as a result is thick, rigid, heavy and difficult to handle.

It has also proved difficult to find a good solution to the water sealing problem. Because all electrical insulation material is more or less hygroscopic, and because the insulation around each electrical conductor has to be thin in order not to take up too much space—which in turn increases the likelihood of point defects and wear damage—a cable in which the insulation around the conductors constitutes the sole water sealing means is not an ideal solution. The usual resource is to provide a watertight jacket surrounding all of the conductors-but in practice, this jacket says watertight for only a short period of time, and it may also create problems (air blisters) if it is too airtight.

BRIEF SUMMARY OF THE INVENTION

The object of the present invention is to provide a gun cable construction which avoids all of the above problems without introducing any new ones. The invention is based on the practice of digital data transmission as described in Norwegian Patent Application No. 83 1203, wherein digitalized signals are multiplexed and transmitted via a small number of screened twisted pairs or via optical fibers in the cable.

The object of the invention is obtained with a gun cable for towing air or water guns behind a seismic vessel constructed with a reinforced air hose in the center region. The air hose is a Kevlar fiber reinforced high pressure air hose with low air diffusion. Outside the hose, signal conductors are placed which are individually insulated with watertight coating and arranged substantially in a single layer of cylindrical elements that are wound around the air hose. The interstices between the elements are filled with a water-repelling lubricant. Outside the layer of cylindrical elements is a protective intermediate jacket not intended primarily to have a water-sealing effect, and this is followed by tension relieving elements preferably disposed in two layers twisted in opposite directions around the intermediate jacket. An outer protective jacket for the entire cable can be provided on the exterior. A cable constructed in this way provides a solution of the water-sealing problem. It is especially intended for digital data transmission.

BRIEF DESCRIPTION OF THE DRAWING

The construction of the cable will be described below in detail with reference to the accompanying drawing, which shows part of a gun cable in cross section. The numerals below corresponds to the reference numbers on the drawing.

DETAILED DESCRIPTION

The innermost layer is a high pressure air hose consisting of a nylon inner hose reinforced with spun Kevlar fiber. Nylon is selected because it is the artificial material which seems to have the lowest air diffusion at the pressures in question. The Kevlar reinforcement is essential for preventing wear damage in the cable at pulsating pressures, which cause the hose diameter to pulsate as well. An understanding of the air hose's pulsation and the wear damage that results from this, and the use of Kevlar reinforcement to remedy these problems, is a basic aspect of the invention. The Kevlar fiber reinforcement is spun at an angle which minimizes radial volume expansion of the air hose.

The next layer consists of a plurality (say, 20-30) of longitudinal, cylindrical elements wound around the air hose. Such a cylindrical element might be either:

- a (multiwire) copper conductor having individual watertight sealing of polyethylene insulation. This is utilized for transmitting electrical firing pulses to an air gun, or
- a twisted conductor is individually sealed watertight by a coating of pair wherein each of the conductors polyethylene insulation, with a screen around the conductor pair and a jacket of polyethylene outside the screen, or
- one or more optical fibers with a common protective jacket surrounding them.

Because the multiplex technique is used, only one layer of such cylindrical elements is necessary, as opposed to the 2-4 layers used in present-day cables. The empty spaces forming interstices in the layer of between the cylindrical elements are filled with vaseline, partly to lubricate the surfaces and thus reduce wear, and partly to hinder water migration through the interstices.

Polyethylene is utilized as the watertight sealing conductor insulation because this is the least hygroscopic of the known insulation materials. This material is seldom used today on this type of cable because it is difficult to cast sealing material around it and therefore difficult to achieve a completely tight seal at the conductors at the end of the cable. In the cable of the invention, this problem is solved separately.

It is also an essential aspect of the invention that the polyethylene insulation around each conductor and around each screened pair is tested for point defects before the cable is assembled.

The combination of the above measures provides a satisfactory watertight seal without using a watertight outer jacket. This is the second essential feature of the invention, and it is obtained through the use of:

(a) only one layer of conductor elements, which reduces the possibility of sparks and concentrated compressive strain on the conductor insulation and watertight seal, the conductor layer being disposed outside the air hose 1 which has minimum pulsation and therefore causes less wear;

(b) polyethylene as the conductor insulation;

(c) two separate layers of polyethylene around the twisted conductors, providing double security;

(d) alternately, transmission of multiplexed signals on optical fibers which are immune to penetration by water;

(e) vaseline as lubricant and extra water barrier; and (f) conductor insulation which is pre-tested for point defects.

Outside the conductor layer, an intermediate protective jacket 3 is arranged. Its function is not primarily water sealing. This jacket could be made of polyurethane or polyethylene, and its main function is to hold the cylindrical elements and vaseline in place and to provide protection against local external compressive strains. These properties can be obtained with a relatively thin jacket.

Air that leaks out from the air hose will either diffuse through this jacket into the surrounding water, or it will escape at the ends of the cable. Blistering will be impossible because the jacket is held in place by steel reinforcement outside this layer.

Two layers 4 of steel reinforcement, twisted around the cable in respective opposite directions, are disposed outside the jacket 3. The steel reinforcement has the following functions:

(a) to absorb/relieve tension in the cable;

(b) to provide mechanical protection against bending, wear and local external compressive strains; and (c) to prevent the formation of blisters in the underlying jacket.

Since preferably only one layer of electrical conductors is utilized in the cable and because the jacket around the conductor elements is thin, it is possible to utilize two full layers of cross-laid steel reinforcement 4 without having the cable become too thick, rigid, heavy and difficult to handle using the methods and equipment most common today.

Optionally, an outer jacket 5 of a strong, wear-resistant artificial material may be provided outside the steel reinforcement to hold the reinforcement in place and to prevent the reinforcement from "unraveling" if a break should occur in the steel wire. A suitable material is thermoplastic polyester. The outer jacket does not necessarily have to be watertight, but it could easily become torn during use. The main emphasis is therefore on its wear-resistance.

The above-described invention constitutes a completely new total solution for gun cable construction. The known problems experienced with present-day cables are avoided, and the invention makes it possible to produce cables with a substantially longer life than the cables known at present.

We claim:

1. A cable for towing air or water guns behind a seismic vessel conducting marine seismic explorations comprising:
   - a central high pressure air hose reinforced with Kevlar fiber reinforcing means and having low air diffusion;
   - a single layer of electrical conductors having a cylindrical cross-section wound around said air hose to provide interstices in said layer between said conductors;
   - a watertight coating of insulating material enclosing individually each of said conductors;
   - water-repellant lubricant filling said interstices;
   - a protective intermediate jacket surrounding said layer of conductors for retaining said conductors and lubricant in place and providing protection against local external compressive strains and not primarily to provide a water-sealing effect; and
   - two layers of tension relieving elements twisted in opposite directions around said intermediate jacket.

2. A cable as claimed in claim 1 wherein: said air hose further comprises an inner hose of nylon reinforced with spum Kevlar fiber.

3. A cable as claimed in claim 1 wherein: said electrical conductors comprise single strand copper conductors; and said insulating material comprises polyethylene.

4. A cable as claimed in claim 1 wherein: said electrical conductors comprise multiwire copper conductors; and said insulating material comprises polyethylene.

5. A cable as claimed in claim 1 wherein: said electrical conductors each comprise a twisted, screwed conductor pair; and said insulating material comprises polyethylene.

6. A cable as claimed in claim 1 wherein: each conductor comprises an optical fiber.

7. A cable as claimed in claim 1 wherein: each conductor comprises a plurality of optical fibers having a common insulating water-sealing coating.

8. A cable as claimed in claim 2 wherein: each conductor comprises a plurality of optical fibers having a common insulating water-sealing coating.

9. A cable as claimed in claim 1 wherein: said water-repellant lubricant comprises vaseline.

10. A cable as claimed in claim 1 wherein: said intermediate jacket comprises a layer of polyurethane.

11. A cable as claimed in claim 1 and further comprising: an outer jacket of wear-resistant thermoplastic polyester material not having primary water-sealing properties.

12. A cable as claimed in claim 1 wherein: said tension relieving elements are made of steel.

13. A cable as claimed in claim 2 wherein: said Kevlar fiber reinforcement is spun at an angle which minimizes radial volume expansion of said air hose.

14. A cable as claimed in claim 13 wherein: said tension-relieving elements are made of steel.

15. A cable as claimed in claim 14 wherein: said electrical conductors comprise multiwire copper conductors; and said insulating material comprises polyethylene.

* * * * *